United States Patent
Lim

(10) Patent No.: US 7,090,244 B2
(45) Date of Patent: Aug. 15, 2006

(54) PASSENGER AIR BAG SYSTEM FOR VEHICLES

(75) Inventor: Gyu Sung Lim, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 172 days.

(21) Appl. No.: 10/702,470

(22) Filed: Nov. 7, 2003

(65) Prior Publication Data

US 2005/0082800 A1    Apr. 21, 2005

(30) Foreign Application Priority Data

Oct. 17, 2003    (KR) .................. 10-2003-0072615

(51) Int. Cl.
*B60R 21/205*    (2006.01)
(52) U.S. Cl. .................. 280/728.2; 280/732
(58) Field of Classification Search ............. 280/728.1, 280/728.2, 732, 736, 741
See application file for complete search history.

(56) References Cited

U.S. PATENT DOCUMENTS

| | | | | |
|---|---|---|---|---|
| 4,153,273 A | * | 5/1979 | Risko ..................... | 280/740 |
| 5,295,708 A | * | 3/1994 | Siga et al. ............... | 280/732 |
| 5,503,428 A | * | 4/1996 | Awotwi et al. ......... | 280/730.2 |
| 5,735,572 A | * | 4/1998 | Clark et al. ............ | 297/216.13 |
| 2004/0262897 A1 | * | 12/2004 | Hier et al. .............. | 280/732 |

FOREIGN PATENT DOCUMENTS

| | | | |
|---|---|---|---|
| DE | 19626903 A1 | * | 6/1997 |
| FR | 2704510 A1 | * | 11/1994 |
| GB | 2227212 A | * | 7/1990 |
| JP | 11091503 A | * | 4/1999 |

* cited by examiner

*Primary Examiner*—David R. Dunn
(74) *Attorney, Agent, or Firm*—Greenblum & Bernstein, P.L.C.

(57) ABSTRACT

A passenger air bag system for vehicles includes an air bag housing directly mounted to a cowl cross member, an inflator mounted in the cowl cross member for discharging gas to the air bag housing through diffuser holes formed at the outer circumference of the cowl cross member when a collision of the vehicle occurs, a connector fixed to the inflator at one end thereof for connecting the inflator and an external device, and a cushion accommodated in the air bag housing such that the cushion is expanded to the front of a passenger seated in a passenger seat by means of the gas discharged from the inflator.

23 Claims, 6 Drawing Sheets

PASSENGER AIR BAG SYSTEM FOR VEHICLES

RELATED APPLICATIONS

The present disclosure relates to subject matter contained in Korean Application No. 10-2003-72615, filed on Oct. 17, 2003, which is herein expressly incorporated by reference in its entirety.

BACKGROUND OF THE INVENTION

1. Field of the Invention

The present invention relates to an air bag system for vehicles, and more particularly to an improved passenger air bag system for vehicles wherein the structure of the passenger air bag system is simple, the size of the passenger air bag system is reduced, and the assembly operation of the passenger air bag system is easy and convenient.

2. Description of the Related Art

Generally, an air bag system for vehicles is mounted in front of a driver seat or a passenger seat in such a manner that a cushion of the air bag system is instantly expanded when a collision of the vehicle occurs for protecting a driver or a passenger from injury.

The air bag systems may be classified into a driver air bag system and a passenger air bag system. The driver air bag system is mounted to the steering wheel of the vehicle for protecting the driver from injury. The passenger air bag system is mounted to an instrument panel of the vehicle disposed in front of the passenger seat for protecting the passenger from injury. Basically, the driver air bag system is requisite, and the passenger air bag system is optional; however, vehicles with passenger air bag systems basically mounted therein for protecting passengers from injury are on the increase in recent years.

FIG. 1 is a perspective view showing a conventional passenger air bag system, and FIG. 2 is a cross-sectional view showing the conventional passenger air bag system.

As shown in FIGS. 1 and 2, the conventional passenger air bag system for vehicles comprises: an air bag housing 6 mounted to an instrument panel 2 and to a cowl cross member 4; an inflator 8 attached to the air bag housing 6 for discharging gas when a collision of the vehicle occurs; a connector 10 having one end connected to the inflator 8 for transmitting electric current and an operation signal from an external device to the inflator 8; a cushion 12 accommodated in the air bag housing 4 such that the cushion 8 is expanded to the front of a passenger seat by means of the gas discharged from the inflator 8; and a retainer 14 attached to the air bag housing 6 for supporting the cushion 12.

The air bag housing 6 comprises: a cushion housing 16 formed in the shape of a box with the front part opened so that the cushion 12 is accommodated in the cushion housing 16 while being folded; and a can housing 18 connected to the rear part of the cushion housing 16, in which the inflator 8 is disposed.

The cushion housing 16 is provided along both longitudinal sides at the front part thereof with flanges 16a, respectively, which are fixed to the rear part of the instrument panel 2 by means of bolts. At the instrument panel 2, to which the cushion housing 16 is attached, is formed a crush pad 2a having a cut line, by which the crush pad 2a is easily broken when the cushion 12 is expanded.

The crush pad 2a of the instrument panel 2 constructed as described above is smoothly broken by means of the cushion 12 expanded by the gas discharged from the inflator 8 when a collision of the vehicle occurs, whereby the cushion 12 is rapidly expanded toward a passenger seated in the passenger seat.

The can housing 18 is connected to the rear part of the cushion housing 16 in such a manner that the can housing 18 communicates with the cushion housing 16. The can housing 18 is attached to the cowl cross member 4 in the instrument panel 2 by means of a mounting bracket 20.

One end of the mounting bracket 20 is fixed to the side part of the can housing 18 by means of a bolt, and the other end of the mounting bracket 20 is fixed to a prescribed area of the outer circumference of the cowl cross member 4 by means of a bolt.

Consequently, the air bag housing 6 is disposed between the instrument panel 2 and the cowl cross member 4 in such a manner that the front part of the air bag housing 6 is fixed to the instrument panel 2, and the rear part of the air bag housing 6 is fixed to the cowl cross member 4.

The inflator 8 is formed in the shape of a cylinder. The inflator 8 is longitudinally disposed in the can housing 18, and both ends of the inflator 8 are fixed to the can housing 18. The inflator 8 is connected to an external device, such as an electronic control unit (not shown) and a power supply terminal (not shown) via the connector 10.

When a collision of the vehicle occurs, an operation signal is transmitted from the electronic control unit to the inflator 8. The inflator 8 is exploded by means of electric current supplied from the power supply terminal for generating gas having more than a prescribed pressure.

The cushion 12 is mounted in the can housing 18 together with the retainer 14 in such a manner that the inlet part of the cushion 12 communicates with a gas-guiding hole 14a formed at the center of the retainer 14.

In the conventional passenger air bag system for vehicles with the above-stated construction, the operation signal is transmitted from the electronic control unit to the inflator 8 via the connector 10 when a collision of the vehicle occurs, and then the inflator 8, to which electric current is supplied from the power supply terminal, is exploded to generate gas.

The gas generated by means of inflator 8 flows along the can housing 18 so that the gas is guided through the gas-guiding hole 14a of the retainer 14. The gas flowing through the gas-guiding hole 14a of the retainer 14 is introduced into the cushion 12 through the inlet part of the cushion 12.

The cushion 12 is expanded at prescribed pressure and speed by means of the gas introduced into the cushion 12. The crush pad 2a of the instrument panel 2 is broken by means of the cushion 12 expanded as described above. Subsequently, the cushion 12 is further expanded toward the passenger seated in the passenger seat.

Consequently, shock transmitted to the passenger when a collision of the vehicle occurs is effectively absorbed by means of the cushion 12 expanded as described above, and thus injury to the passenger is minimized.

In the conventional passenger air bag system for vehicles, however, the can housing 18 having the inflator 8 disposed therein is fixedly attached to the cowl cross member 4 by means of the mounting bracket 20. That is to say, the mounting bracket 20 is unavoidably used in the conventional passenger air bag system for vehicles. Consequently, the number of components of the passenger air bag system is increased, and the assembly operation of the passenger air bag system is very complicated.

Especially, the space between the instrument panel 2 and the cowl cross member 4 is very small and narrow. As a result, the size and the shape of the air bag housing 6 are excessively restricted. Furthermore, the conventional air bag system may interfere with other components of the vehicle when the air bag system is assembled or operated.

SUMMARY OF THE INVENTION

Therefore, the present invention has been made in view of the above problems, and it is an object of the present invention to provide a passenger air bag system for vehicles wherein an inflator is mounted in a cowl cross member, and an air bag housing is directly attached to the outer circumference of the cowl cross member, whereby the structure of the passenger air bag system is simple, the size of the passenger air bag system is reduced, and the assembly operation of the passenger air bag system is easy and convenient.

In accordance with the present invention, the above and other objects can be accomplished by the provision of a passenger air bag system for vehicles, comprising: an air bag housing directly mounted to a cowl cross member; an inflator mounted in the cowl cross member for discharging gas to the air bag housing through diffuser holes formed at the outer circumference of the cowl cross member when a collision of the vehicle occurs; a connector fixed to the inflator at one end thereof for connecting the inflator and an external device; and a cushion accommodated in the air bag housing such that the cushion is expanded to the front of a passenger seated in a passenger seat by means of the gas discharged from the inflator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
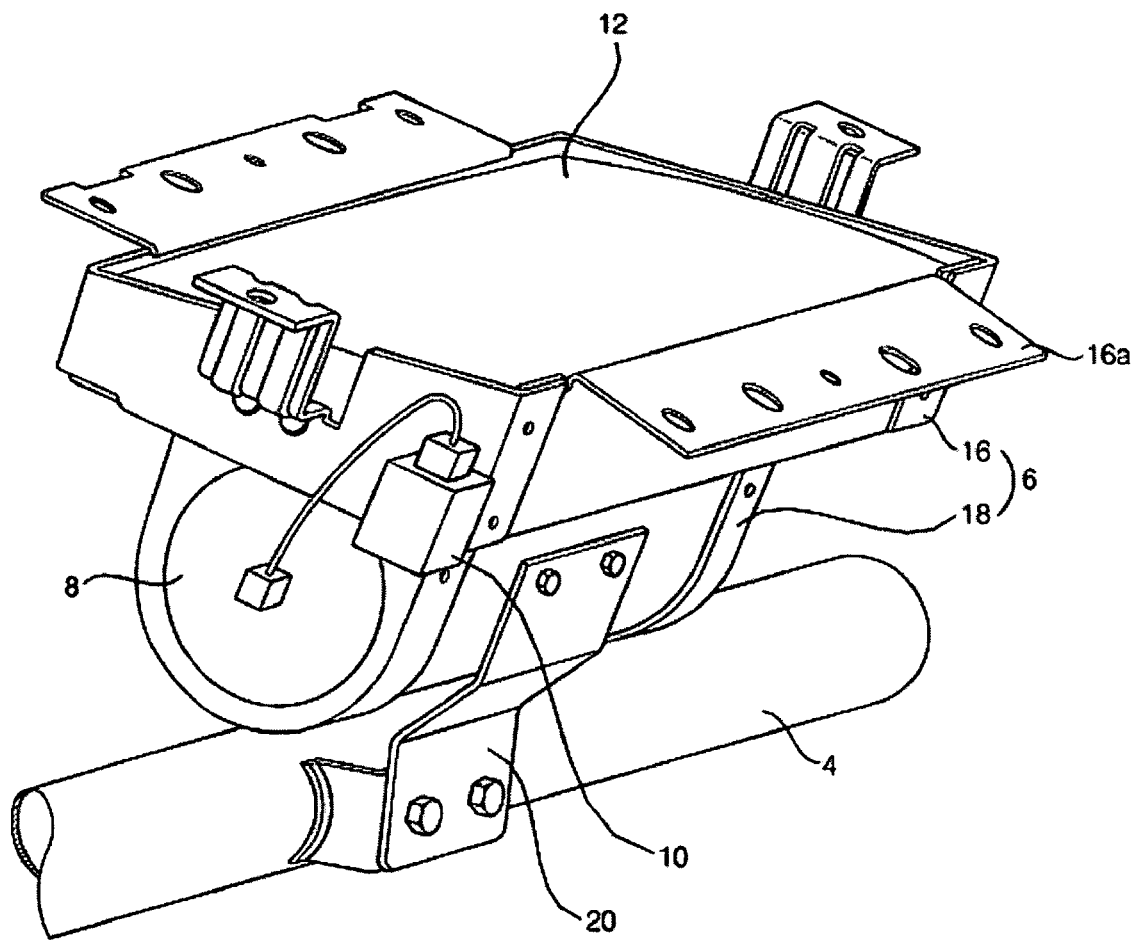
FIG. 1 is a perspective view showing a conventional passenger air bag system.
Figure 2:
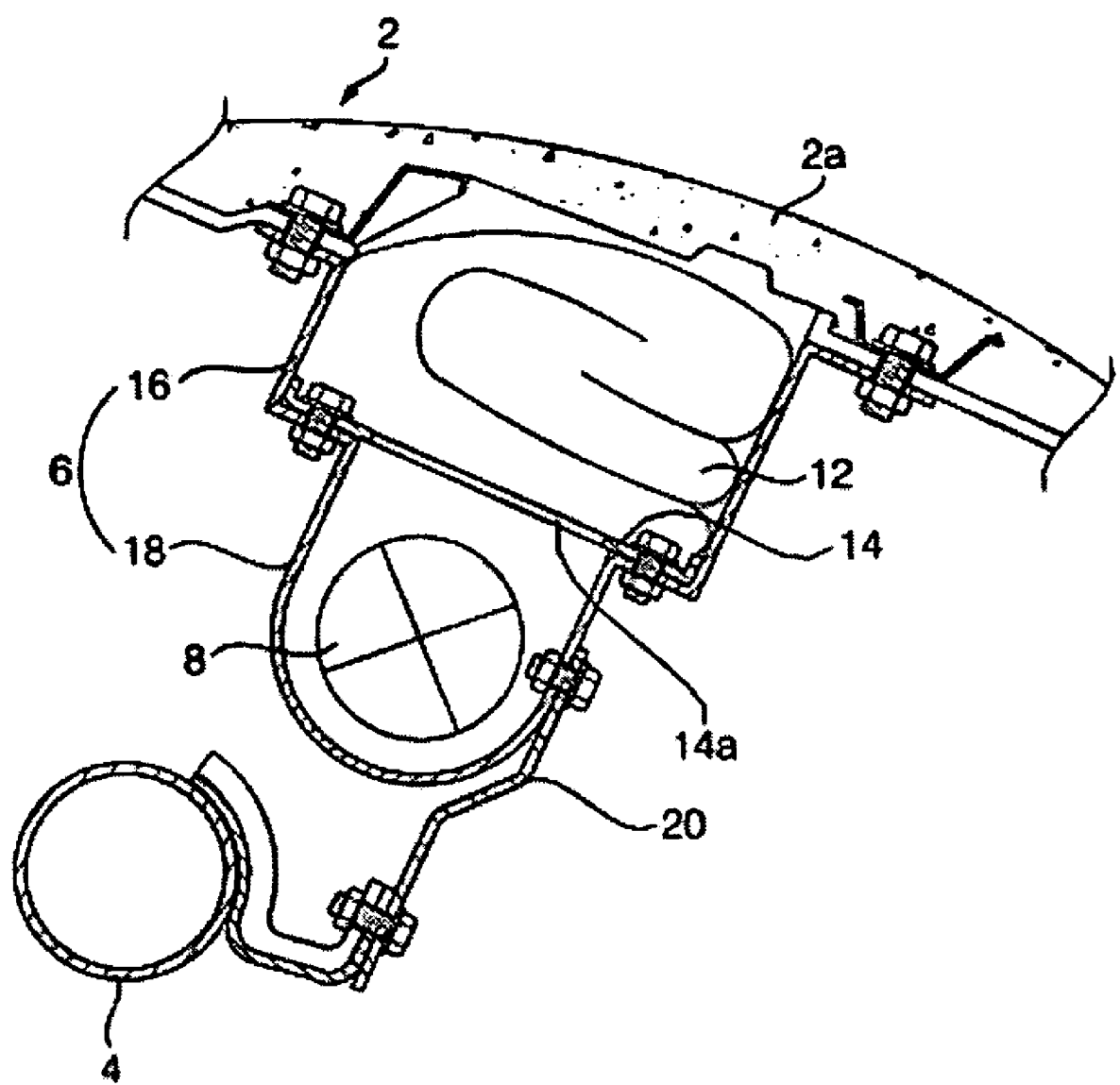
FIG. 2 is a cross-sectional view showing the conventional passenger air bag system.
Figure 3:
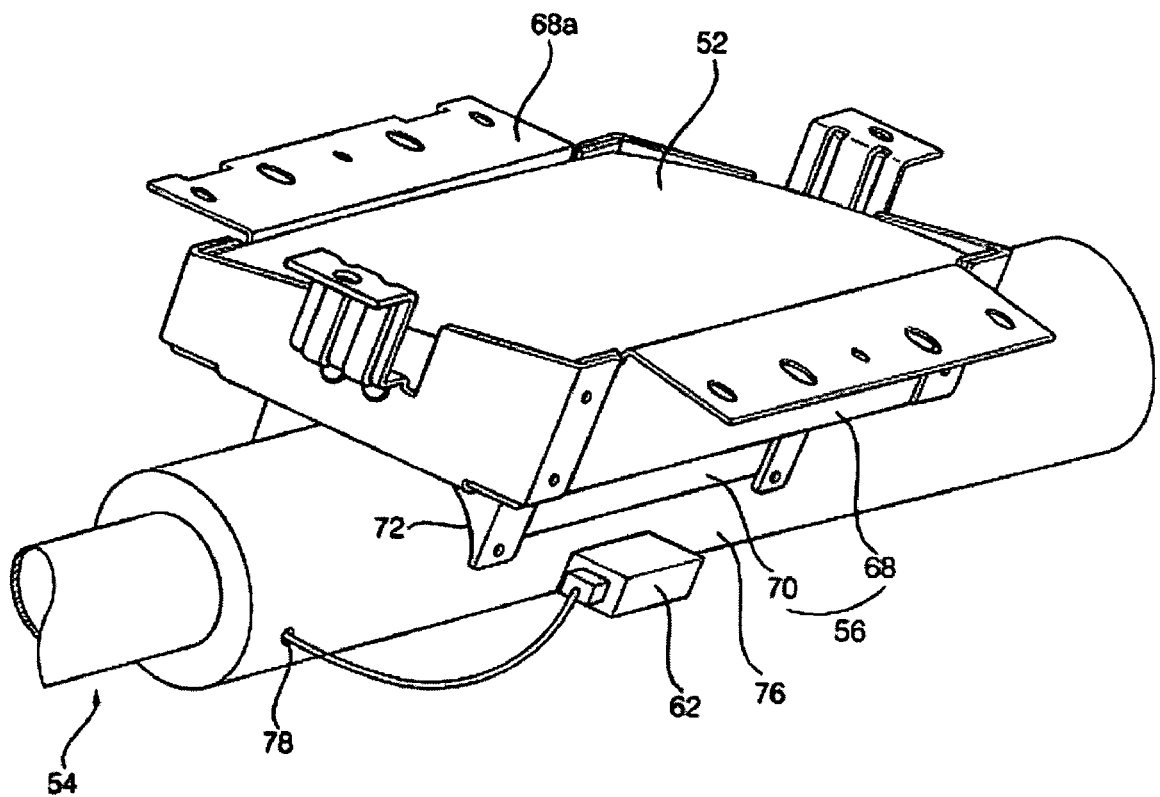
FIG. 3 is a perspective view showing a passenger air bag system of the present invention.
Figure 4:
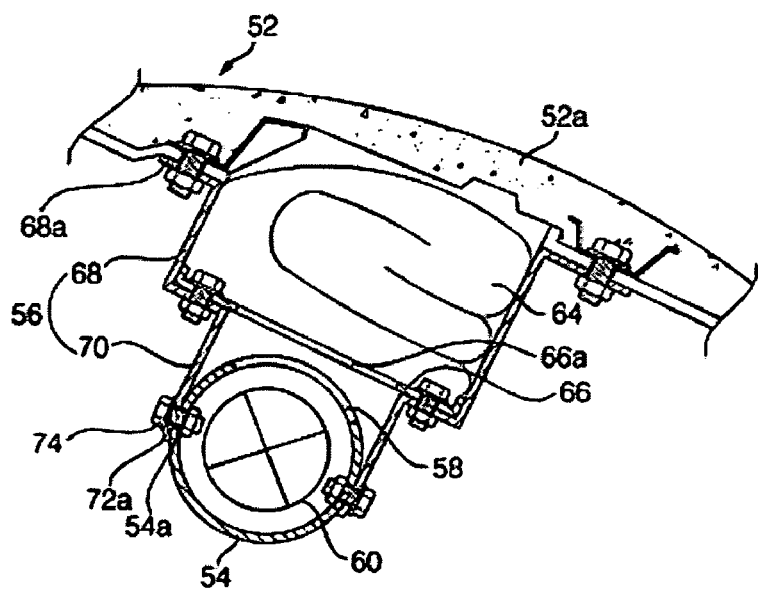
FIG. 4 is a side view, in section, showing a passenger air bag system according to a first preferred embodiment of the present invention.
Figure 5:
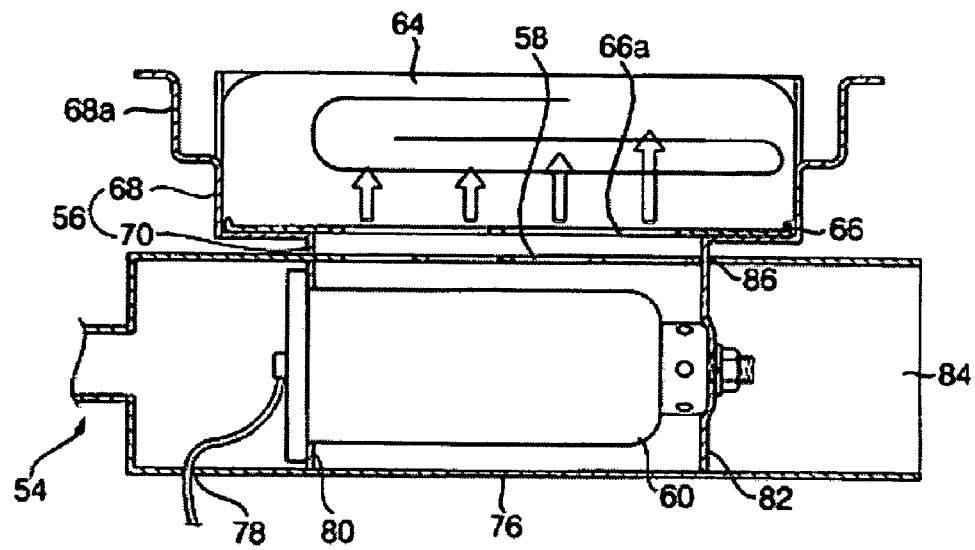
FIG. 5 is a front view, in section, showing the passenger air bag system according to the first preferred embodiment of the present invention.
Figure 6:
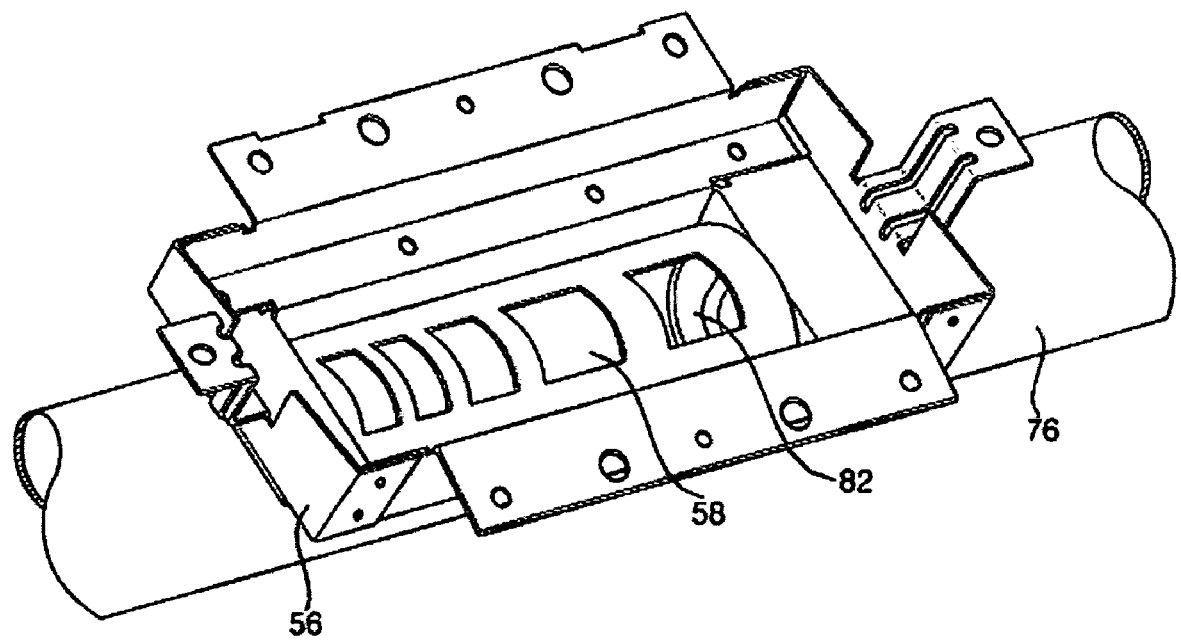
FIG. 6 is a perspective view of the passenger air bag system according to the first preferred embodiment of the present invention showing main components of the passenger air bag system.
Figure 7:
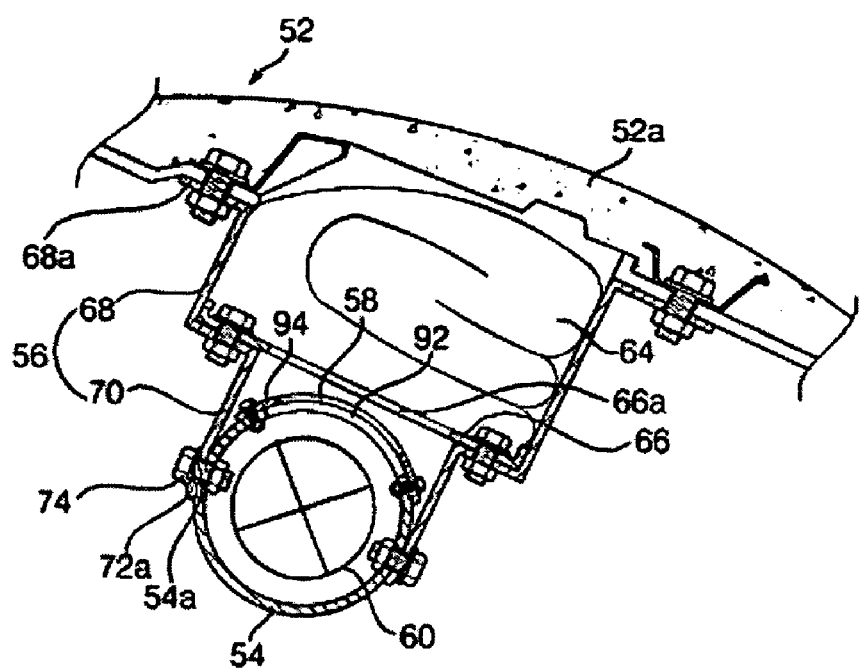
FIG. 7 is a side view, in section, showing a passenger air bag system according to a second preferred embodiment of the present invention.
Figure 8:
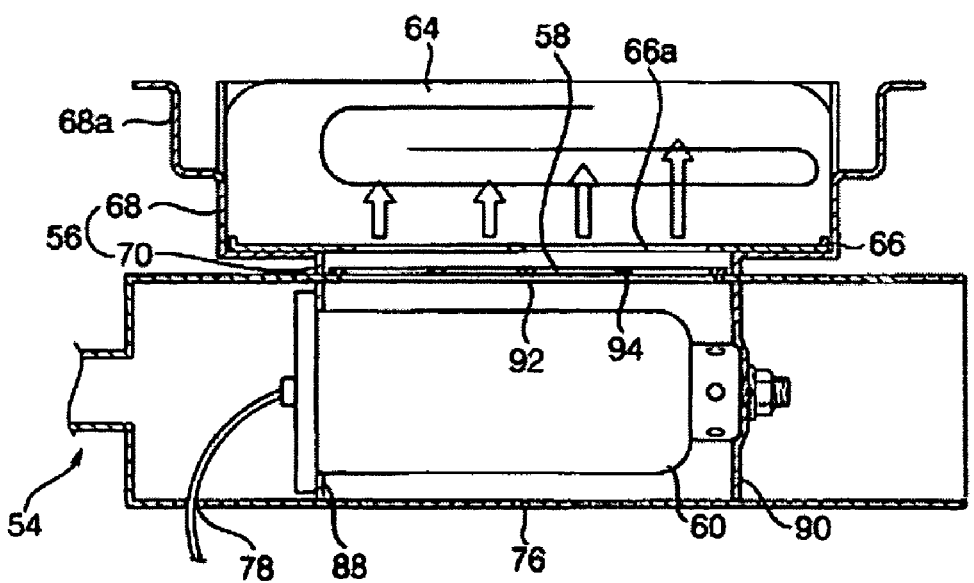
FIG. 8 is a front view, in section, showing the passenger air bag system according to the second preferred embodiment of the present invention.
Figure 9:
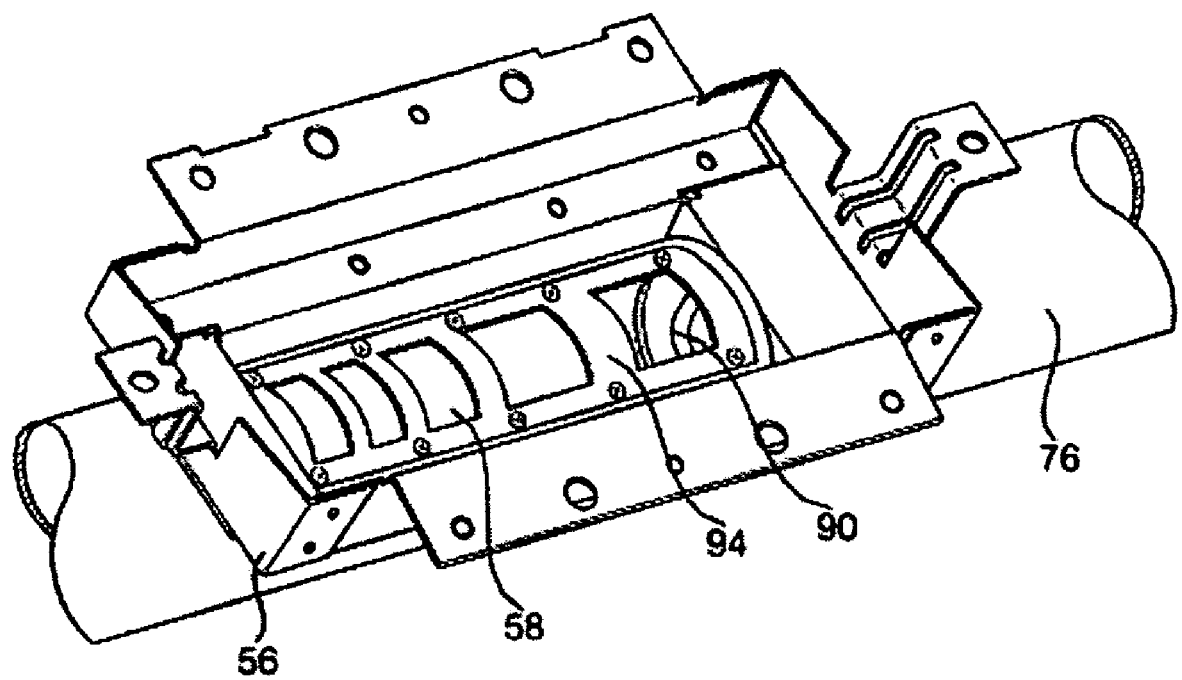
FIG. 9 is a perspective view of the passenger air bag system according to the second preferred embodiment of the present invention showing main components of the passenger air bag system.

FIG. 3 is a perspective view showing a passenger air bag system of the present invention, FIG. 4 is a side view, in section, showing a passenger air bag system according to a first preferred embodiment of the present invention, FIG. 5 is a front view, in section, showing the passenger air bag system according to the first preferred embodiment of the present invention, FIG. 6 is a perspective view of the passenger air bag system according to the first preferred embodiment of the present invention showing main components of the passenger air bag system, FIG. 7 is a side view, in section, showing a passenger air bag system according to a second preferred embodiment of the present invention, FIG. 8 is a front view, in section, showing the passenger air bag system according to the second preferred embodiment of the present invention, and FIG. 9 is a perspective view of the passenger air bag system according to the second preferred embodiment of the present invention showing main components of the passenger air bag system.

As shown in FIGS. 3 to 9, the passenger air bag system for vehicles according to the present invention comprises: an air bag housing 56 directly mounted to the rear part of an instrument panel 52 at the front part thereof and directly mounted to a cowl cross member 54 at the rear part thereof; an inflator 60 mounted in the cowl cross member 54 for discharging gas to the air bag housing 56 through diffuser holes 58 formed at the outer circumference of the cowl cross member 54 when a collision of the vehicle occurs; a connector 62 connecting the inflator 60 and an external device for transmitting an operation signal and electric current to the inflator 60; a cushion 64 accommodated in the air bag housing 56 such that the cushion 64 is expanded to the front of a passenger seated in a passenger seat by means of the gas discharged from the inflator 60; and a retainer 66 mounted in the air bag housing 56 together with the cushion 64 for supporting the cushion 64, the retainer 66 having a gas-guiding hole 66a for guiding the gas discharged from the inflator 60 to the cushion 64.

The air bag housing 56 comprises: a cushion accommodating part 68 formed in the shape of a box with the front part opened for accommodating the cushion 64 therein; and a housing fixing part 70 attached to the rear part of the cushion accommodating part 68 and fixed to a prescribed area of the outer circumference of the cowl cross member 54.

The cushion accommodating part 68 is provided along both longitudinal sides at the front part thereof with flanges 68a, respectively, which are fixed to the rear part of the instrument panel 52 by means of bolts. At the instrument panel 52 is formed a crush pad 52a having a cut line, by which the crush pad 52a is easily broken by means of the expanding pressure of the cushion 64.

Consequently, the crush pad 52a of the instrument panel 52 is smoothly broken by means of the cushion 64 expanded by the gas discharged from the inflator 60 when a collision of the vehicle occurs, whereby the cushion 60 is rapidly expanded toward a passenger seated in the passenger seat.

The housing fixing part 70 is fixed to the rear part of the cushion accommodating part 68 while the housing fixing part 70 communicates with the cushion accommodating part 68. The housing fixing part 70 is provided at the rear part thereof with a semicircular fixing groove 72, which is put on the outer circumference of the cowl cross member 54.

The fixing groove 72 has the same diameter as the cowl cross member so that the fixing groove 72 is tightly put on the outer circumference of the cowl cross member 54. At both ends of the semicircular fixing groove 72 are formed first fixing holes 72a, respectively. Similarly, at the outer circumference of the cowl cross member 54 are formed second fixing holes 54a. The housing fixing part 70 is securely fixed to the cowl cross member 54 by means of fixing elements fitted in the first fixing holes 72a and the second fixing holes 54a.

The first fixing holes 72a, which are formed at both ends of the semicircular fixing groove 72, exactly correspond to the second fixing holes 54a formed at the outer circumference of the cowl cross member 54.

The inflator 60 is mounted in the cowl cross member 54. At one side of the cowl cross member 54, to which the housing fixing part 70 is attached, is formed an inflator accommodating part 76 for accommodating the inflator 60.

The inflator accommodating part 76 is formed in the shape of a hollow cylinder. On the outer circumference of the inflator accommodating part 76, to which the housing fixing part 70 is attached, is formed the diffuser holes 58. Especially, the cowl cross member 54 is formed such that the inner diameter of the inflator accommodating part 76 is larger than the outer diameter of the inflator 60.

The cowl cross member 54 is formed in the shape of a hollow pipe. The inner diameter of the cowl cross member 54 is smaller than the outer diameter of the inflator 60. Consequently, the diameter of the cowl cross member 54 is increased such that the cowl cross member 54 is formed in the shape of a step in the diametrical direction thereof at the area where the air bag housing 56 is mounted. As a result, the inflator accommodating part 76 is formed so that the inflator 60 is disposed in the inflator accommodating part 76.

The connector 62 is used to connect an external device, such as a power supply terminal and an electronic control unit, to the inflator 60. An operation signal and electric current are transmitted from the power supply terminal and the electronic control unit to the inflator 60 via the connector 62.

The connector 62 is connected to the inflator 60 via a connector hole 78 formed at the cowl cross member 54 such that the connector hole 78 communicates with the inner hollow part of the cowl cross member 54. The connector hole 78 is preferably formed at the outer circumference of the cowl cross member 54 at the other area excluding the closed space where the inflator 60 is accommodated.

As shown in FIGS. 4 to 6, the inflator accommodating part 76 has a first fixing part 80 formed at the one end thereof for fixing one end of the inflator 60, an opening part 84 formed at the other end thereof, through which the inflator 60 is inserted into the inflator accommodating part 76, and an insertion hole 86 formed at the outer circumference thereof, through which a second fixing part 82 for fixing the other end of the inflator 60 is inserted.

The first fixing part 80 and the second fixing part 82 serve to securely fix both ends of the inflator 60, respectively. Also, the first fixing part 80 and the second fixing part 82 are closely attached to the inner sides of the inflator accommodating part 76 for maintaining airtightness of the space where the inflator 60 is accommodated.

Especially, the second fixing part 82 is integrally formed with the fixing groove 72 of the housing fixing part 70. Consequently, the second fixing part 82 is inserted into the inflator accommodating part 76 through the insertion hole 86 for fixing the other end of the inflator 60 when the air bag housing 56 is attached to the inflator accommodating part 76.

The opening 84 is formed at the other end of the inflator accommodating part 76 so that the opening 84 serves as an entrance for inserting the inflator 60 formed in the shape of a can into the inflator accommodating part 76. The opening 84 is opened or closed after the second fixing part 82 is inserted into the insertion hole 86. Consequently, the insertion of the inflator 60 is performed before the installation of the air bag housing 56.

The insertion hole 86 and the diffuser holes 58 are formed at the inflator accommodating part 76 constructed as described above at the area where the housing fixing part 70 is disposed. The diffuser holes 58 communicate with the inner accommodating space of the inflator accommodating part 76 for diffusing the gas generated by means of the inflator 60 to the air bag housing 56.

The diffuser holes 58 are arranged in large numbers on the outer circumference of the inflator accommodating part 76. The sizes of the diffuser holes 58 are different from each other so that the discharge of the gas is smoothly carried out from the inflator 60.

As shown in FIGS. 7 to 9, the inflator accommodating part 76 may have a first fixing part 88 formed at the one end thereof for fixing one end of the inflator 60, a second fixing part 90 formed at the other end thereof for fixing the other end of the inflator 60, and an inflator-mounting hole 92 formed at the outer circumference thereof for mounting the inflator 60 therein.

The first fixing part 88 and the second fixing part 90 serve to securely fix both ends of the inflator 60, respectively. Also, the first fixing part 88 and the second fixing part 90 are closely attached to the inner sides of the inflator accommodating part 76 for maintaining airtightness of the space where the inflator 60 is accommodated. The first fixing part 88 and the second fixing part 90 are previously fixed to the inflator accommodating part 76 when the cowl cross member 54 is manufactured.

The inflator-mounting hole 92 is formed at the outer circumference of the inflator accommodating part 76 at the area where the housing fixing part 70 is mounted. To the inflator-mounting hole 92 is detachably attached a cover 94 so that the inflator 60 accommodated in the inflator accommodating part 76 is dropped into the air bag housing 56 through the inflator-mounting hole 92.

The cover 94 is fixed at the outer circumference of the inflator accommodating part 76 by means of bolts. The cover 94 is provided at the center thereof with diffuser holes 58, through which the gas generated by means of the inflator 60 is supplied to the air bag housing 56.

The diffuser holes 58 are arranged in large numbers on the cover 94. The sizes of the diffuser holes 58 are different from each other so that the discharge of the gas is smoothly carried out from the inflator 60.

Now, the operation of the passenger air bag system with the above-stated construction according to the present invention will be described in detail.

When a collision of the vehicle occurs, an operation signal is transmitted from the electronic control unit to the inflator 60 via the connecter 62. The inflator 60 is exploded by means of electric current supplied from the power supply terminal for generating gas.

The gas generated by means of inflator 60 flows to the housing fixing part 70 of the air bag housing 56 through the diffuser holes 58 formed at the outer circumference of the inflator accommodating part 76. The gas supplied to the housing fixing part 70 is guided into the cushion 65 through the gas-guiding hole 66a of the retainer 66.

At this time, the cushion 64 is expanded at prescribed pressure and speed by means of the gas introduced into the cushion 64. The instrument panel 52 is broken by means of the cushion 64 expanded as described above. Subsequently, the cushion 64 is further expanded toward a passenger seated in a passenger seat, whereby shock transmitted to the passenger when a collision of the vehicle occurs is effectively absorbed.

As apparent from the above description, the present invention provides a passenger air bag system for vehicles wherein an inflator is mounted in a cowl cross member, and an air bag housing is directly attached to the outer circumference of the cowl cross member. Consequently, the present invention has effects that the structure of the passenger air bag system is simple, the size of the passenger air bag system is reduced, and thus the passenger air bag system is miniaturized.

Since the passenger air bag system is miniaturized as described above, the spatial restriction of the air bag system when the air bag system is installed is mitigated. Consequently, the air bag system can be easily and conveniently mounted in the small and narrow space inside the instrument panel, and thus interference between the air bag system and the other components of the vehicle is minimized.

Also, the air bag housing is directly attached to the cowl cross member, which does not require a mounting bracket used to fix the conventional air bag housing to the cowl cross member, whereby the number of components of the passenger air bag system is decreased, and the assembly operation of the passenger air bag system is simple.

Furthermore, the cost of manufacturing the air bag system is reduced as the size of the air bag housing is decreased, and the number of components of the passenger air bag system is decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A passenger air bag system for vehicles, comprising:
    an air bag housing directly mounted to an outer circumference of a cowl cross member;
    an inflator mounted in the cowl cross member to discharge gas into the air bag housing through diffuser holes formed at the outer circumference of the cowl cross member when a collision of the vehicle occurs;
    a connector fixed to an end of the inflator to electrically connect the inflator and an external device; and
    a cushion accommodated in the air bag housing such that the cushion is expanded toward a passenger seat, and
    wherein the cowl cross member further comprises:
    an inflator accommodating part having a first fixing part formed at one end to fix one end of the inflator, and opening part formed at an other end to allow the inflator to be inserted in the accommodating part, and an insertion hole formed at an outer circumference of the accommodating part to allow insertion of a second fixing part to fix the other end of the inflator.

2. The system as set forth in claim 1, wherein the air bag housing is directly mounted to a rear part of an instrument panel at a front part of the air bag housing, and directly mounted to an outer circumference of the cowl cross member at the rear part of the airbag housing while communicating with the diffuser holes.

3. The system as set forth in claim 2, wherein the air bag housing comprises:
    a cushion accommodating part to accommodate the cushion therein; and
    a housing fixing part attached to a rear part of the cushion accommodating part and directly fixed to an outer circumference of the cowl cross member.

4. The system as set forth in claim 3, wherein the housing fixing part is provided with a semicircular fixing groove, the semicircular fixing groove having the same diameter as the cowl cross member.

5. The system as set forth in claim 4, wherein the housing fixing part has first fixing holes formed at ends of the housing fixing part, and the cowl cross member has second fixing holes formed at the outer circumference of the cowl cross member, the second fixing holes of the cowl cross member corresponding to the first fixing holes of the housing fixing part, and
    wherein the housing fixing part is securely fixed to the cowl cross member by fixing elements fitted in the first fixing holes and the second fixing holes.

6. The system as set forth in claim 5, wherein the first and second fixing holes are numerous.

7. The system as set forth in claim 1, wherein an inner diameter of the cowl cross member is larger than an outer diameter of the inflator so that the inflator is accommodated in the cowl cross member.

8. The system as set forth in claim 3, wherein the second fixing part is integrally formed with a fixing groove of the housing fixing part.

9. The system as set forth in claim 1, wherein the first fixing part and the second fixing part are hermitically attached to inner sides of the inflator accommodating part, respectively, to isolate an inner space of the inflator accommodating part from the outside.

10. The system as set forth in claim 1, wherein the first fixing part has a terminal insertion hole formed at a center so that a connector terminal formed at one end of the inflator is inserted through the terminal insertion hole.

11. The system as set forth in claim 1, wherein the inflator accommodating part has an insertion hole and diffuser holes formed at the outer circumference of the inflator accommodating part where the air bag housing is mounted.

12. The system as set forth in claim 1, wherein the diffuser holes are numerous.

13. The system as set forth in claim 10, wherein one end of the connector is connected to the connecter terminal of the inflator through a connector hole formed at the outer circumference of the cowl cross member.

14. The system as set forth in claim 13, wherein the connector hole is formed at the cowl cross member at a location excluding an area where the inflator accommodating part is provided.

15. The system as set forth in claim 1, wherein the inflator accommodating part further comprises an inflator-mounting hole formed at the outer circumference of the inflator accommodating part.

16. The system as set forth in claim 8, wherein the first fixing part and the second fixing part are hermitically attached to inner sides of the inflator accommodating part, respectively, to isolate an inner space of the inflator accommodating part from the outside.

17. The system as set forth in claim 8, wherein the first fixing part has a terminal insertion hole formed at a center so that a connector terminal formed at one end of the inflator is inserted through the terminal insertion hole.

18. The system as set forth in claim 15, wherein the inflator-mounting hole is formed at the outer circumference of the inflator accommodating part at an area where the air bag housing is mounted.

19. The system as set forth in claim 18, further comprising a cover detachably attached to the inflator-mounting hole.

20. The system as set forth in claim 19, wherein the cover is provided at the center of the inflator mounting hole with diffuser holes.

21. The system as set forth in claim 8, wherein the diffuser holes are numerous.

22. The system as set forth in claim 21, wherein an end of the connector is connected to the connecter terminal of the inflator through a connector hole formed at the outer circumference of the cowl cross member.

23. The system as set forth in claim 22, wherein the connector hole is formed at the cowl cross member at a location excluding an area where the inflator accommodating part is provided.

* * * * *

UNITED STATES PATENT AND TRADEMARK OFFICE
CERTIFICATE OF CORRECTION

| | | |
|---|---|---|
| PATENT NO. | : 7,090,244 B2 | Page 1 of 1 |
| APPLICATION NO. | : 10/702470 | |
| DATED | : August 15, 2006 | |
| INVENTOR(S) | : Lim | |

It is certified that error appears in the above-identified patent and that said Letters Patent is hereby corrected as shown below:

At column 7, line 52 (claim 1, line 14) of the printed patent, "and" should be --an--.

Signed and Sealed this

Twenty-seventh Day of November, 2007

JON W. DUDAS
*Director of the United States Patent and Trademark Office*